July 11, 1933.  L. C. WEAVER  1,917,674
WATER, DIRT, AND OIL TIGHT DISK ASSEMBLY
Filed March 12, 1931  2 Sheets-Sheet 1
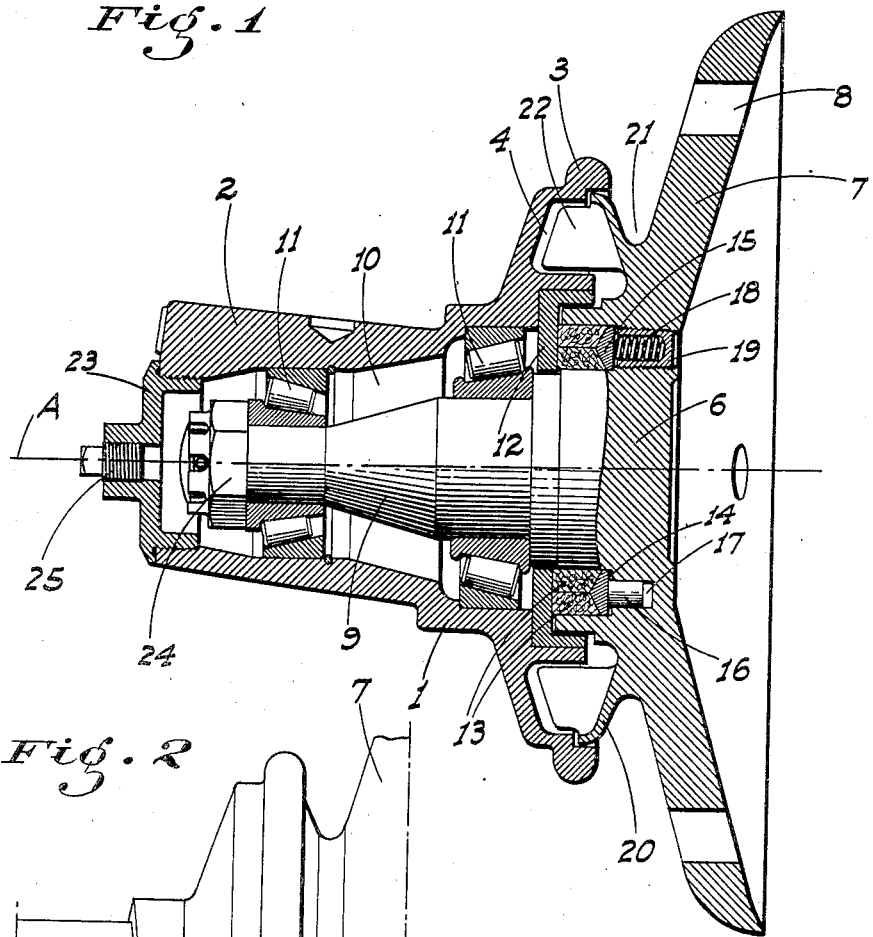
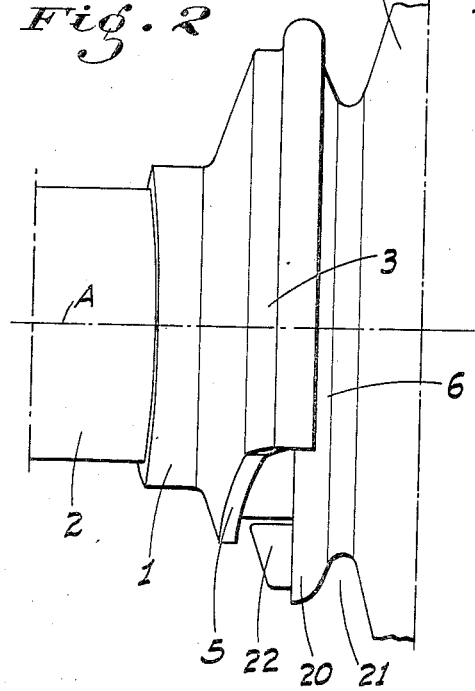
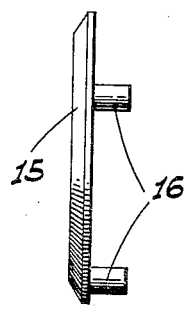
INVENTOR
L. C. Weaver
BY
ATTORNEY July 11, 1933.  L. C. WEAVER  1,917,674
WATER, DIRT, AND OIL TIGHT DISK ASSEMBLY
Filed March 12, 1931   2 Sheets-Sheet 2

INVENTOR
L. C. Weaver
BY
ATTORNEY

Patented July 11, 1933

1,917,674

UNITED STATES PATENT OFFICE

LESTER C. WEAVER, OF STOCKTON, CALIFORNIA

WATER, DIRT AND OIL TIGHT DISK ASSEMBLY

Application filed March 12, 1931. Serial No. 521,998.

This invention relates to the mounting of plow disks in connection with the supporting standards, my principal object being to provide a structure of this character in which the spindle is arranged and mounted so that it is thoroughly protected against the entry of dirt, water, and the like to the bearings, while the lubricant is prevented from being extruded from the bearings.

Rapid abrasion and deterioration of the spindle bearings, which has been a source of annoyance and up-keep expense due to the constant presence of dirt adjacent the bearings, is therefore eliminated. I may, therefore, use anti-friction bearings for the spindle and thus promote ease of rotation and efficiency of operation of the disks without the wear of the parts which heretofore has rendered the use of such bearings impracticable.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional plan of my improved disk assembly structure.

Fig. 2 is a fragmentary side elevation of the same.

Fig. 3 is a side elevation of the gasket pressure ring detached.

Figure 4:
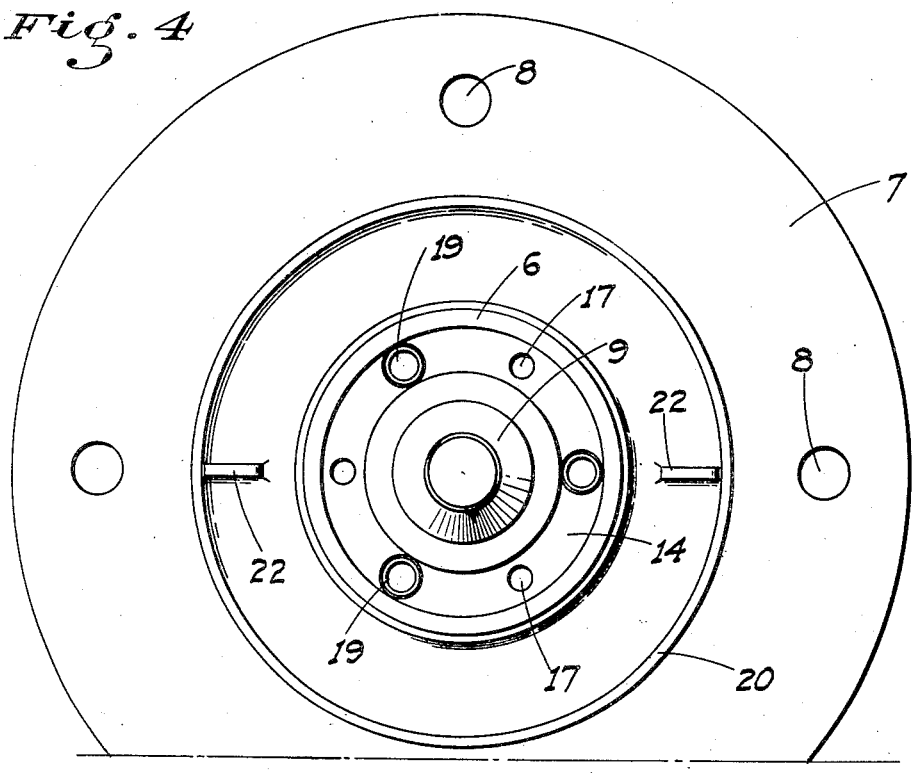
Fig. 4 is an outside view of the disk mounting member of the assembly.
Figure 5:
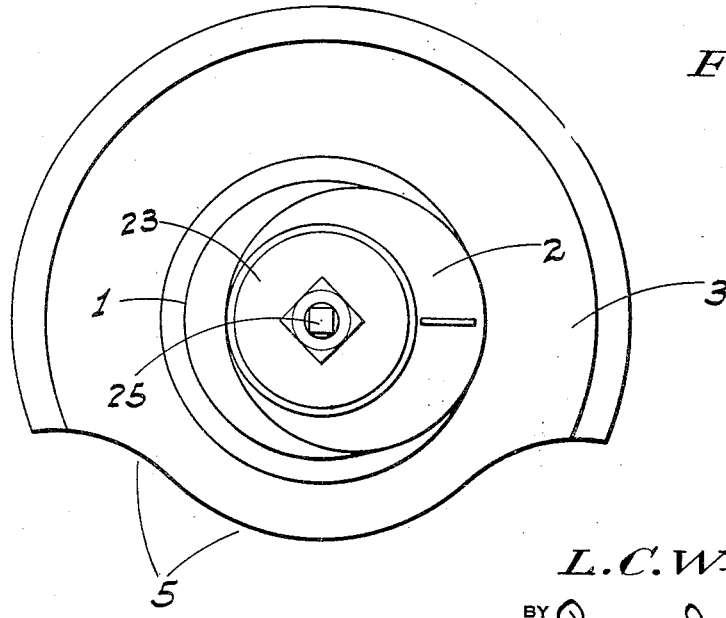
Fig. 5 is a similar view of the spindle mounting member.

Referring now more particularly to the characters of reference on the drawings, the assembly consists initially of two main parts, the spindle supporting member, and the disc supporting member on which the spindle is mounted. The spindle supporting member comprises a hollow body 1, the outermost portion 2 of which is eccentric relative to the main longitudinal axis A of the body as usual, and is adapted to be adjustably clamped in its supporting standard. At its inner end the body is formed with an enlarged flange 3 concentric with the axis A; which flange on its inner face is provided with a relatively deep annular channel or groove 4. For a portion of its circumference at the bottom, this flange is cut away as shown at 5, which of course eliminates the corresponding portion of the channel and leaves the separated ends of the same open to the ground.

The disk supporting member comprises a body 6 having an enlarged dished flange 7 to engage the outer face of a disk and provided with a plurality of bolt holes 8 whereby the disk may be secured to the flange. A spindle 9 concentric with the flange projects outwardly from the same and into the chamber 10 of the body 1, which chamber is concentric with the axis A. Longitudinally spaced anti-friction bearing units 11 preferably of the roller type are disposed between the body 1 and the spindle to support the latter. These bearings are preferably arranged so that all machining operations for the seating of the bearing races and other parts may be performed from the inner end of the body, and thus simplify such operations.

Seated in the body 1 at its inner end and facing the body 6 is a cup 12 which closely surrounds but does not touch the spindle. The bottom of the cup is engaged by a packing unit which comprises inner and outer concentric rings 13 of felt or like material which are retained in a deep annular groove 14 formed in the body 6 in surrounding relation to the spindle. The outer wall of this groove enters the cup 12 and extends nearly to the bottom of the same adjacent its rim, while the spindle itself form the inner wall of the groove.

Mounted in the bottom of the groove is a metal ring 15 having a plurality of pins 16 which are slidable in blind sockets 17 bored in the body 6 from the bottom of the groove. The outer face of the ring is of symmetrically tapered form and the adjacent ends of the packing rings are similarly shaped or tapered as plainly shown in Fig. 1.

The ring 15 is constantly pressed against the packing unit by a plurality of compression springs 18 which bear against the back face of the ring 15 and are seated in hollow plugs or screws 19 which are adjustably mounted in the body 6 from the inner or disk engaging face of the same.

Due to the above form and arrangement of parts, it will be seen that the packing unit is pressed against the cup as well as being expanded radially against both walls of the groove. The packing rings therefore form a perfect seal against the entry of dirt and the like to the spindle bearings and also against outward leakage of lubricant from the bearings. The packing unit itself is protected from contact with dirt by the overlapping walls of the cup 12 and the groove 14.

To keep dirt from contacting with and possibly passing between said walls, the body 6 is provided with a forwardly and outwardly flaring flange 20 whose outer edge fits in the flange 3 around the outer periphery of the channel 4.

Owing to the setting of the flange 20 relative to the flange 7, a V-shaped circumferential groove 21 is formed therebetween. Any dirt sliding down the flange 7 toward the center is therefore caught by said groove and is discharged on to the ground with the rotation of the structure instead of being thrown into the channel 4. The flanges 3 and 20 cannot very well, however, have a close running fit with each other and some dirt is bound to get into the channel. To cause any such dirt to be discharged onto the ground two or more radially disposed vanes 22 are mounted in the forward face of the flange 20, which vanes project into and follow the cross-sectional contour of the channel 4. Since the latter is open on the bottom, any dirt therein as swept around by the rotating vanes will be discharged on to the ground instead of being retained indefinitely in the channel.

Adjustment of setting of the disk is obtained by turning the body 1 in its standard as usual, and the arcuate length of the cut away portion 5 of the flange 3 is sufficient to always maintain the channel 4 open to the bottom regardless of the adjusted position of said body.

The front end of the chamber 10 is closed by a removable plug 23 of sufficient size to enable the retaining nut 24 of the spindle to be removed if necessary. The plug itself has a small plug 25 removably mounted therein so as to enable lubricant to be fed into the chamber when necessary without removing the large plug.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. In combination a relatively stationary body having a longitudinal horizontal chamber open to the inner end of the body, a relatively movable body disposed beyond the open end of the chamber, a spindle on the movable body projecting into and journaled in the chamber, a disk engaging member provided with the movable body, the movable body having an annular groove at and about the base of the spindle facing the chamber, a compressible packing ring in said groove, a member in the stationary body against which the outer face of the ring bears, a rigid ring in the groove behind and bearing on one face against the packing ring, compression springs bearing at one end against the other face of the rigid ring, and socketed screws mounted in the movable body in which the springs are seated.

2. In combination a relatively stationary body having a longitudinal horizontal chamber open to the inner end of the body, a relatively movable body disposed beyond the open end of the chamber, a spindle on the movable body projecting into and journaled in the chamber, a disk engaging member provided with the movable body, an enlarged flange on the inner end of the stationary body, an annular channel formed in said flange and facing the movable body, the flange and channel being cut away at the bottom, a continuous flange on the movable body projecting at its outer edge into the channel adjacent its outer periphery, and radial vanes on said movable body projecting into and substantially following the cross-sectional contour of the channel.

3. A structure as in claim 2, in which said movable body flange forms a continuous deep groove of V section with the disk engaging member.

4. In combination, a relatively stationary member, a rotary member turnably mounted thereon, and projecting from one end thereof, oil sealing means between the members at the adjacent end of the stationary member, an annular channel formed with the stationary member and extending about the sealing means in facing relation to the rotary member, said channel having a bottom outlet and means formed with the rotary member to engage and sweep any dirt entering said channel to the bottom outlet.

5. In combination, a relatively stationary member, a rotary member turnably mounted thereon, and projecting from one end thereof, oil sealing means between the members at the adjacent end of the stationary member, an annular channel formed with the stationary member and extending about the sealing means in facing relation to the rotary member, said channel having a bottom outlet, means on the rotary member forming a substantial closure for the open side of the channel, and means on said last named means to engage any dirt which may enter the channel past the closure and sweep such dirt to the bottom outlet.

6. In combination, a relatively stationary member, a rotary member turnably mounted thereon, and projecting from one end thereof, oil sealing means between the members at the adjacent end of the stationary member, an annular channel formed with the stationary member and extending about the sealing means in facing relation to the rotary member, said channel having a bottom outlet, and radial vanes on said rotary member engaging and substantially following the cross sectional contour of the channel to engage and sweep any dirt in the channel to the bottom outlet thereof with the rotation of the member.

7. In combination, a relatively stationary member, a rotary member turnably mounted thereon, and projecting from one end thereof, oil sealing means between the members at the adjacent end of the stationary member, an annular channel formed with the stationary member and extending about the sealing means in facing relation to the rotary member, said channel having a bottom outlet, a continuous flange on the movable member substantially forming a closure for the open side of the channel, and a disk engaging flange on the movable member; said flanges together forming a relatively deep annular groove of V-section.

In testimony whereof I affix my signature.

LESTER C. WEAVER.